United States Patent

Yamaguchi

Patent Number: 5,278,848
Date of Patent: Jan. 11, 1994

[54] BIDIRECTIONAL COMMUNICATION METHOD

[76] Inventor: Noboru Yamaguchi, 203 Isogo-Mansion, 11-15 Isogodai Isogo-ku, Yokohama-shi, Kanagawa-ken, Japan

[21] Appl. No.: 716,876

[22] Filed: Jun. 18, 1991

[30] Foreign Application Priority Data

Jun. 28, 1990 [JP] Japan .................. 2-170641

[51] Int. Cl.[5] .............................. G06F 11/00
[52] U.S. Cl. ...................... 371/49.1; 371/20.6; 370/85.15
[58] Field of Search .......... 371/2.1, 20.1, 20.6, 371/31, 32, 35, 47.1, 49.1; 370/85.5, 85.12, 85.15, 94.2

[56] References Cited

U.S. PATENT DOCUMENTS 5,163,056 11/1992 Hagiwara et al. .................. 371/20.6
5,170,338 12/1992 Moritoki et al. ................... 371/20.6

Primary Examiner—Vincent P. Canney
Attorney, Agent, or Firm—Sughrue, Mion, Zinn, Macpeak & Seas

[57] ABSTRACT

Serial digital signals containing output information to be written in an input/output device and input information read from an input/output device are transmitted to a slave station and circulate successively through slave stations back to a master station. The output information is written into the slave stations in an output operation, and the input information is read from the input/output device in an input operation. Each of the input/output devices has its own address for selecting a device to be accessed in the output operation and/or the input operation. The serial digital signals are configured in a frame which is identical for the output operation and the input operation. The frame for the input operation with dummy information added to an input/output information block is transmitted from master station. An input/output information block supplied to the slave station is transmitted therefrom to a next slave station or the master station, while replacing the dummy information in the input/output information block with the input information read from the input/output device.

9 Claims, 10 Drawing Sheets

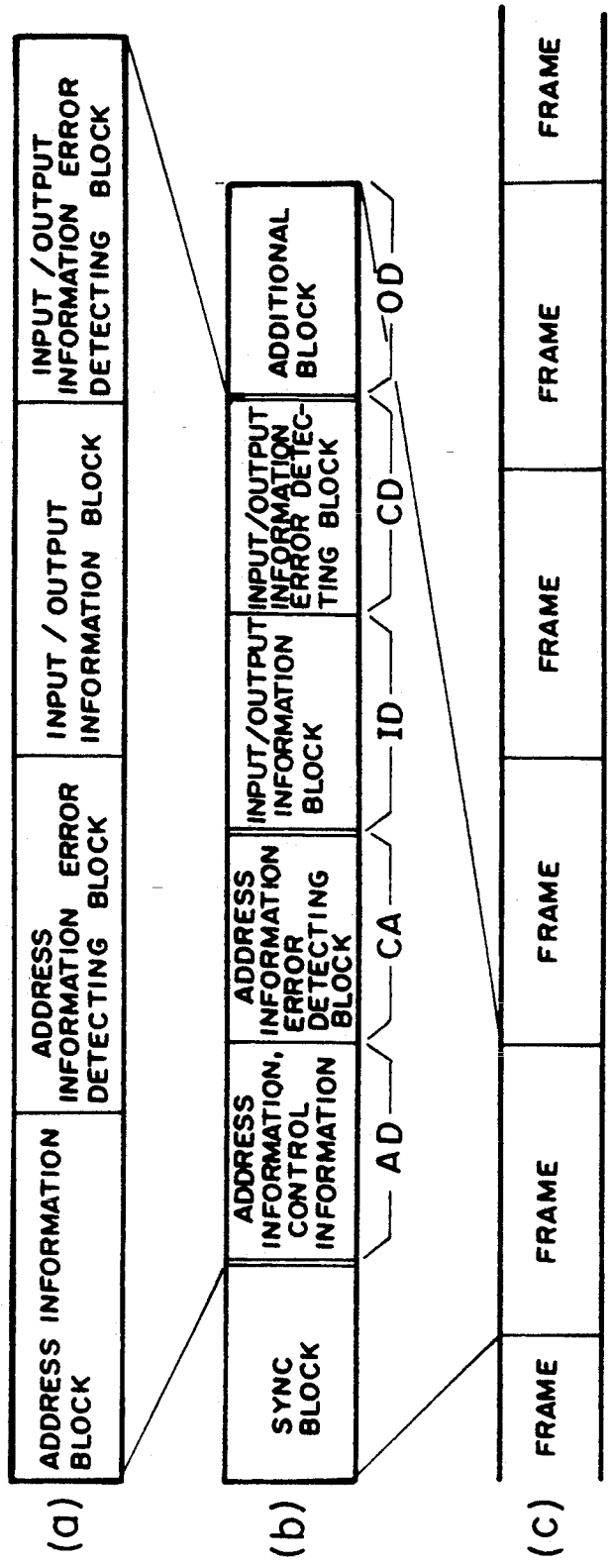

FIG.3
(a)  | W | R | DC1 | DC2 |
(b)
| W | R | OPERATION |
|---|---|---|
| 0 | 0 | NOT OPERATION |
| 1 | 0 | OUTPUT (WRITE) OPERATION |
| 0 | 1 | INPUT (READ) OPERATION |
| 1 | 1 | X (INHIBIT) |
(c)
| DC1 | DC2 | OPERATION |
|---|---|---|
| 0 | 0 | NORMAL OPERATION |
| 1 | 0 | |
| 0 | 1 | |
| 1 | 1 | DUPLICATION CHECK |
FIG.4A
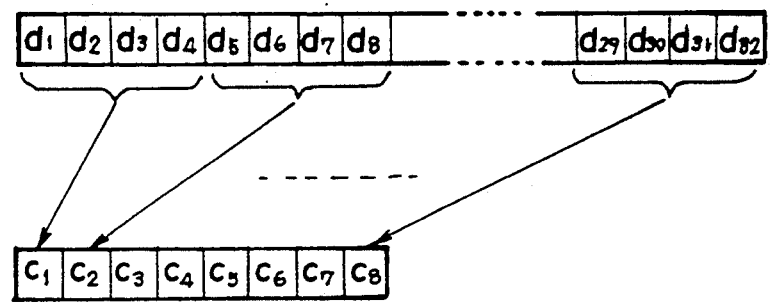
FIG.4B
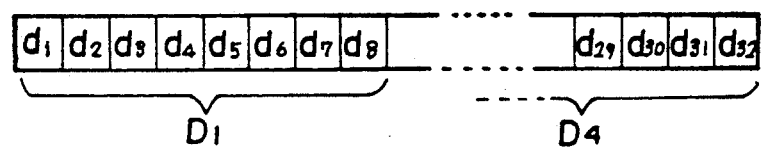
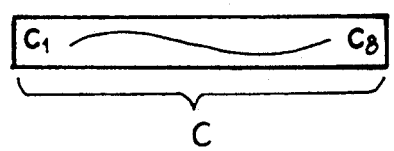

BIDIRECTIONAL COMMUNICATION METHOD

BACKGROUND OF THE INVENTION

1. Field of the Invention

The present invention relates to a method of effecting bidirectional communications by carrying out both an output operation to write output information transmitted from a master station into an input/output device and an input operation to transmit input operation from an input/output device to the master station. More particularly, the present invention is directed to such a bidirectional communication method which is suitable for effecting communications to control a number of input/output devices that are located remotely from each other, such as to remotely control robots, production lines, home-use appliances, display devices, etc., to control simple LANs (Local Area Networks), or to achieve fine control over temperatures and humidities using a number of temperature and humidity sensors that are positioned in remote locations.

2. Description of the Prior Art

Communication systems known as a LAN (Local Area Network) are widely used to effect communications between devices that are remotely spaced at distances of several meters or greater.

FIG. 11 of the accompanying drawings shows a frame of serial digital signals according to the data format of the LAN.

To exchange digital signals between a station (hereinafter referred to as a "master station") and another station (hereinafter referred to as a "slave station"), a frame of serial digital signals is generated by the master station and transmitted from the master station to the slave station.

As shown in FIG. 11, the frame usually includes a frame synchronizing signal at its leading end, which indicates the leading end of the frame. The frame also has, following the frame synchronizing signal, a control information field indicating the length of the frame, the type of the frame, etc., an address information field indicating a slave station designated to receive the frame, and an information field containing output information to be transmitted to the slave station. The frame also includes, following the output information field, an error detecting code such as a parity-bit code or a code produced using a check sum, for determining whether or not the output information contained in the output information field has been modified or rewritten by noise or the like during the transmission of the frame, and an end code indicating the trailing end of the frame. The end code may be omitted and the control and address information fields may be switched around in some frames.

The frame of the above structure is generated by the master station and transmitted to the slave station. The slave station which is designated by the address contained in the address information field receives the transmitted frame, and processes, e.g., stores, the output information according to the control information contained in the control information field. When information is to be sent from the slave station to the master station, the same procedure as the procedure described above is employed, and a frame similar to the above frame is generated by the slave station and transmitted to the master station.

The communication protocol (communication procedure or rules) described above allows a large amount of information efficiently from one station to another station.

There are instances where a command is to be transmitted from a master station to a slave station to energize a single lamp at the slave station, and the on/off information of a single pushbutton switch connected to the slave station is to be read by a master station. If the above communication protocol is employed in those cases which require communication of a relatively small amount of information, then the communication process will be very inefficient to carry out.

FIG. 12 of the accompanying drawings schematically illustrates a master station M and slave stations $S_1$, $S_2$ which communicate with each other according to the communication protocol as shown in FIG. 11. In FIG. 12, four input/output devices $IO_{11}$, $IO_{12}$, $IO_{13}$, $IO_{14}$ are connected to the slave station S1, and three input/output devices $IO_{21}$, $IO_{22}$, $IO_{23}$ are connected to the slave station $S_2$.

Now, it is assumed that the input/output device $IO_{11}$ is a pushbutton switch, and the master station M is to recognize the on/off status of the pushbutton switch, i.e., whether the pushbutton switch is turned on or off.

The master station M generates a frame, as shown in FIG. 11, whose control and output information fields contain a written command to read the status of the push-button switch $IO_{11}$ in the slave station $S_1$ and transmit the read status to the master station M. The master station M then transmits the generated frame to the slave station $S_1$. The slave station $S_1$ then reads the contents of the received frame, and interprets the frame such that the slave station $S_1$ is required to send the on/off status of the pushbutton switch $IO_{11}$. The slave station $S_1$ reads the status of the pushbutton switch $IO_{11}$, newly generates a frame containing information as to the status of the push-button switch $IO_{11}$, and transmits the generated frame to the master station M. The master station M receives the frame transmitted from the slave station $S_1$, reads the contents of the frame, and recognizes the on/off status of the pushbutton switch $IO_{11}$.

Both the master station M and the slave station S1 have respective microcomputers for generating frames and interpreting received frames. Therefore, each of the stations is complex in structure. Since it is necessary to design control communication software for each of the slave stations in addition to the master station, the period of time needed to design the necessary software is long, and the software thus designed is highly costly. The above many steps to be followed to transmit the information result in an inefficient, slow communication process for the exchange of a relatively small quantity of information.

SUMMARY OF THE INVENTION

In view of the aforesaid problems of the conventional bidirectional communication method, it is an object of the present invention to provide a method of effecting bidirectional communication simply, quickly, and inexpensively between master and slave stations which do not have microcomputers and software therefor, but are constructed of a piece of hardware that can easily be implemented as an LSI circuit, and without the need for the conventional communication protocol, in a control system using a signal transmission network of one or more input/output devices that are located at remote positions spaced by several meters or more, for example, and are interconnected by transmission lines.

According to the present invention, there is provided a method of bidirectional communication in a signal transmission network comprising one or more slave stations each connected to at least one input/output device for writing and/or reading digital information, the input/output device having at least one access terminal for access control, a master station for initially transmitting a serial digital signal containing output information to be written in the input/output device and for finally receiving a serial digital signal containing input information read from the input/output device, and a transmission route for transmitting the serial digital signals, the transmission route interconnecting the master and slave stations in a loop so that signals transmitted by the master station circulate successively through the slave stations and are received by the master station, the bidirectional communication including an output operation to write the output information transmitted by the master station into a desired one of the input/output devices in an output operation, and an input operation to transmit the input information read from a desired one of the input/output devices to the master station, the method comprising the steps of:

allotting each of the input/output devices its own address for selecting a device to be accessed in the output operation and/or the input operation;

configuring a serial digital signal transmitted from the master station through the slave stations back to the master station, in a frame which is identical for the output operation and the input operation, the frame including an address information block containing address information indicative of the address allotted to the input/output device and control information for controlling the slave stations and the input/output device, an address information error detecting block containing a first code for detecting an error in a signal representing the address information block, an input/output information block containing the output information and/or input information, and an input/output information error detecting block containing a second code for detecting an error in a signal representing the input/output information block, with the address information block, the address information error detecting block, the input/output information block, and the input/output information error detecting block being arranged in the order named; and transmitting, from the master station, the frame for the input operation with dummy information added to the input/output information block, and transmitting, from the slave station connected to the input/output device to which the address contained in the address information block in the transmitted frame is allotted, the input/output information block supplied to the slave station to a next slave station or the master station, while replacing the dummy information in the input/output information block with the input information read from the input/output device to which the address is allotted.

In order to access the input/output device based on the address information, each of the slave stations preferably comprises an address regenerator for regenerating the address information contained in the serial digital signal transmitted from the master station, through serial-to-parallel conversion, into a parallel output signal, and an address decoder for receiving a part or all of the parallel output signal from the address regenerator, and for generating a chip select signal as a parallel output signal for selectively accessing the input/output device through code conversion with logic gates.

To facilitate replacement of the input/output information block in the slave stations during the input operation, each of the slave stations further includes an access detector having a logic arrangement for producing a predetermined logic output signal when at least one of the input/output devices is accessed.

Preferably, the second code contained in at least a portion of the input/output information error detecting block of the frame for the input operation which is transmitted from the master station, is reversed in polarity in the slave station connected to the input/output device which has the address contained in the address information block of the frame for the input operation.

Furthermore, a plurality of the input/output devices preferably have respective own addresses different from each other, and a common second address.

Preferably, the address information block has an area for recording a duplication-check command code for effecting input and output operations with respect to a set of two identical frames which are successively transmitted from the master station.

The serial digital signal may be available in a frame for the input operation, a frame for the output operation, and a frame for a non-operation, the frame for a non-operation being identical in format to the frames for input and output operations.

In cases where there is such a frame for a non-operation, the first code and/or the second code contained in at least a portion of the address information error detecting block and/or the input/output information error detecting block of the frame transmitted from the master station is preferably identical for the frame for the input operation, the frame for the output operation, and the frame for the non operation, the first code and/or the second code being common in polarity for the frame for the input operation and the frame for the output operation, and being reversed in polarity for the frame for the non-operation.

When the frame for the non-operation is transmitted from the master station, the input information read from the input/output device is preferably recorded in the frame for the non-operation.

With the bidirectional communication method according to the present invention, the master and slave stations are interconnected in a loop by the transmission route. The frame of identical format for input and output operations, which includes an address information block, an address information error detecting block, an input/output information block, and an input/output information error detecting block, arranged in the order named, is transmitted from the master station, and circulates successively through the slave stations back to the master station.

In the output operation, each of the slave stations is supplied with address information and control information contained in the address information block. When the address information and the control information are found correct based on a first code contained in the address information error detecting block, the output operation is recognized as correct. At the time an output signal contained in the input/output information block following the address information error detecting block and a second code contained in the input/output information error detecting block are supplied, the output information is written into the input/output device which has the address contained in the address information block. The frame supplied to the slave station can be supplied to a downstream slave station connected thereto or the master station with only a slight time lag of its own caused by synchronization in the slave station or the like. In the input operation, at the time the address information and the control information contained in the address information block are supplied, i.e., before the first code contained in the address information error detecting block is confirmed, input information from the input/output device is read and obtained. When the first code is confirmed as correct, the next input/output information can be transmitted to a next station while replacing dummy information contained in the next input/output information block with the input information. Therefore, in the input operation, the block can also be transmitted to the next station with only a slight time lag caused by synchronization in the slave station or the like.

Accordingly, the input operation can be effected at high speed through a simple process which is the same as that of the output operation. Each of the slave stations is not required to have a microcomputer to perform a complex procedure such as for analyzing the contents of frames, and can be implemented by a piece of hardware in the form of a simple circuit arrangement for both the input and output operations.

Heretofore, addresses are assigned such that the numbers of slave stations are used as part or all of the addresses and the numbers of input/output devices are used as part of the addresses or contained in the output information. According to the present invention, addresses are allotted directly to the input/output devices. Since the slave station numbers are not used as addresses, the signals to be transmitted are shortened, and it is possible to allot a common address to a plurality of input/output devices in order to access the input/output devices simultaneously.

In order to selectively access an input/output device according to the addressing system of the present invention, each of the slave stations should have an address regenerator and an address decoder. The address regenerator usually comprises a combination of a shift register and a latch circuit, and the address decoder comprises a simple combination of logic gates. Therefore, a chip select signal for selectively accessing the input/output devices can be generated by a simple general-purpose piece of hardware.

The access detector may easily be achieved by ORing chip select signals. The replacement of the dummy information with the input information in the input/output information block in the input operation can easily be controlled by processing the output signal from the access detector, the control information, and the result of check of the address information error detecting block with a logic circuit.

The second code contained in at least a portion of the input/output information error detecting block of the frame for an input operation which is transmitted from the master station is reversed in polarity in the slave station which is to effect the input operation based on this frame. When the polarity of the second code is reversed, even if the dummy information and the control information are of the same bit pattern, the recording of the input information in the slave station can be confirmed in the master station. Therefore, the entire system is rendered highly reliable.

In cases where the input/output devices have their own addresses which are different from each other and some plural input/output devices also have a common address, these plural input/output devices can simultaneously be accessed simply be transmitting a single block which designates the second address. Accordingly, the entire system is rendered highly flexible.

For higher reliability and safety, a duplication check may be effected such that two identical blocks are transmitted successively, and a certain access is effected only when the information contained in the transmitted blocks is correct and identical. Usually, the system hardware is assembled such that the duplication check is either carried out or not. According to the present invention, however, as described later in the embodiment of the present invention, the duplication-check function can be achieved with a simple sequence. Whether an access is to be made with one block or a duplication check is to be carried out can be selected per operation by adding a control code indicative of whether the duplication check is to be carried out to a portion of the control information.

Furthermore, the serial digital signal may be available in a frame for a non-operation as well as frames for input and output operations. When no input or output operation is to be performed, a frame for a non-operation may continuously be transmitted from the master station for idling. With such a frame for a non-operation being transmitted, any non-signal zones where no frame is transmitted can be avoided, and the signals can easily be synchronized.

When a frame for a non-operation is employed and the control information includes information indicative of the frame for a non-operation, the frame for a non-operation may be rewritten into a frame for an input operation or a frame for an output operation due to noise during the transmission of the frame. Such a danger can be prevented by reversing the polarity of a first code and/or a second code contained in the frame for a non-operation with respect to the polarity of those in the frames for input and output operations. Thus, almost no trouble occurs when the frame for a non-operation suffers noise.

The frame for a non-operation may not be simply used for idling, but may be used to record special input information which is to be usually introduced as interrupt information that represents the result of periodic monitoring of the status of an emergency stop button, for example. If the frame for a non-operation is used in this manner, it is not necessary to introduce the input information through an input operation at all times.

BRIEF DESCRIPTION OF THE DRAWINGS

FIG. 2 is a diagram of frames used in the signal transmission network shown in FIG. 1;

FIG. 3 is a diagram of a sequence of bits of control information;

FIGS. 4A and 4B are diagrams showing examples of the manner in which a first code in the frames is generated;

FIG. 5 is a diagram of another sequence of frames;

DETAILED DESCRIPTION OF THE PREFERRED EMBODIMENT

Figure 1:
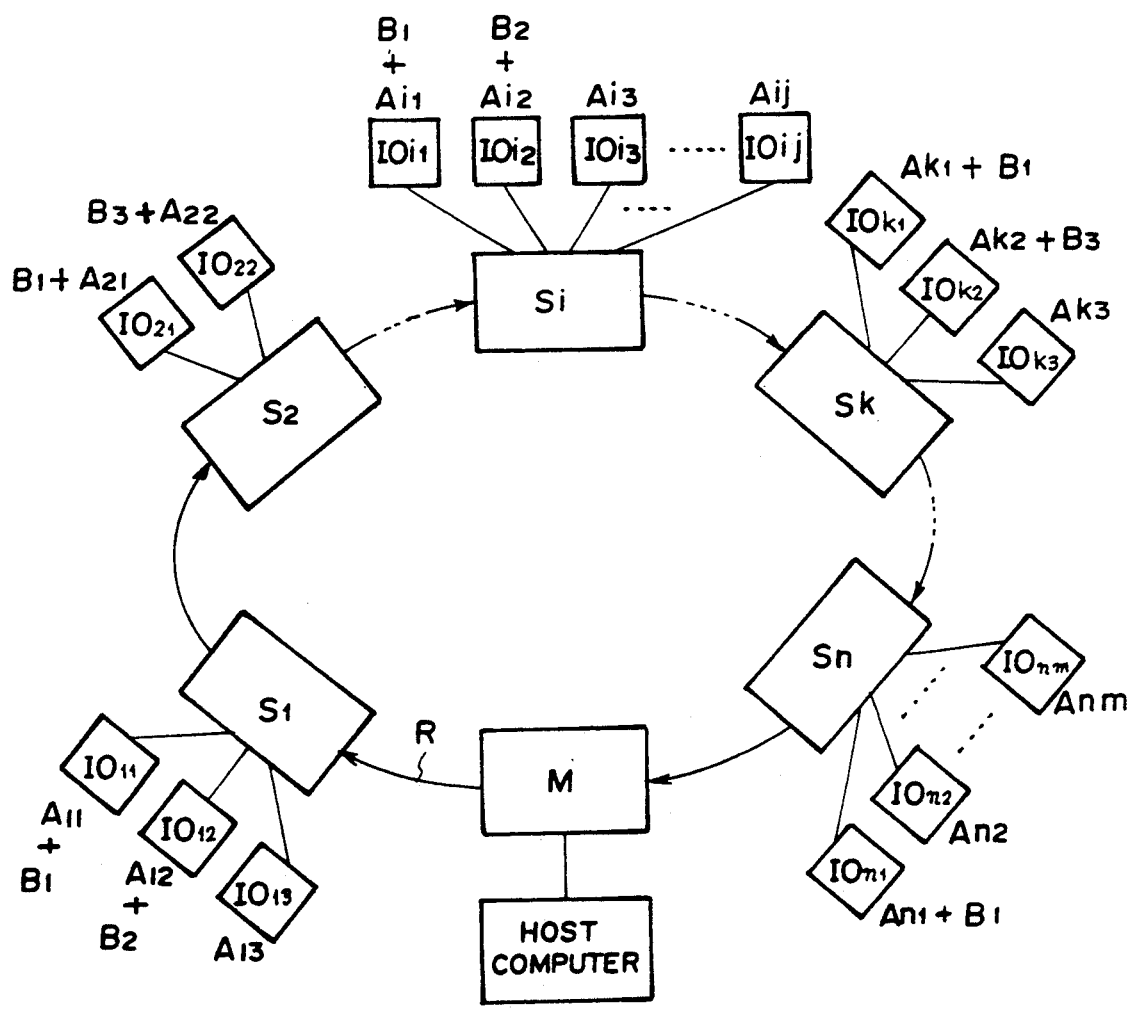
FIG. 1 is a block diagram of a signal transmission network to be controlled by a bidirectional communication method according to the present invention.

FIG. 1 schematically shows a signal transmission network which is controlled by a bidirectional communication method according to the present invention.

A serial digital signal is transmitted through a communication route R from a master station M to which a host computer is connected. The serial digital signal is transmitted through slave stations $S_1, S_2, \ldots, S_i, \ldots, S_k, \ldots, S_n$ back to the master station M, either as it is or modified en route. To the slave stations $S_1, S_2, \ldots, S_i, \ldots, S_k, \ldots, S_n$, there are connected input/output devices $IO_{IJ}$ ($I=1, 2, \ldots, i, \ldots, k, \ldots, n$; $J=1, 2, \ldots, m$ (a positive integer depending on I)). The master station M has a function to interface with the host computer, and also a function to transmit and receive serial signals, and is constructed of a piece of hardware that is implemented primarily by an electronic circuit. The slave station $S_j$ ($j=1, 2, \ldots, i, \ldots, k, \ldots, n$) has a function to interface with its input/output devices and also a function to transmit and receive serial signals, and is also constructed of a piece of hardware that is implemented primarily by an electronic circuit. The transmission route R is composed of a pair of stranded wires, a coaxial cable, an optical fiber, or the like.

The signal transmission network shown in FIG. 1 may be used to remotely control a production line to bottle predetermined quantities of several types of beverages, apply labels to the bottles, classify the bottles, package the bottles in boxes, and report operation data. In such an example, the master station M is placed in a central control room, the slave station $S_1$ is positioned at the inlet end of the line, the slave station $S_2$ is at a next step, and the slave station $S_n$ is positioned at the outlet end of the line. The input/output devices $\overline{IO}_{11}, \overline{IO}_{21}, \ldots, \overline{IO}_{i1}, \ldots, \overline{IO}_{k1}, \ldots, \overline{IO}_{n1}$ are assigned respectively to displays for receiving and digitally displaying operation statuses at the respective steps. The input/output devices $\overline{IO}_{12}, \overline{IO}_{i2}$ are assigned respectively to counters for counting bottles using microswitches. The input/output devices $\overline{IO}_{22}, \overline{IO}_{k2}$ are assigned respectively to line motors whose rotational speeds can be controlled by digital input signals. The input/output device $\overline{IO}_{13}$ is assigned to a sorting device for sorting bottles using various sensors and for producing digital output signals indicative of results of the sorting operation. The input/output devices $\overline{IO}_{i3}, \ldots, \overline{IO}_{ij}$ are assigned respectively to various solenoid-operated valves for controlling the quantity of beverages to be filled in bottles using digital input signals. The input/output device $\overline{IO}_{k3}$ is assigned to a labeling machine. The input/output devices $\overline{IO}_{n2}, \ldots, \overline{IO}_{nm-1}$ are assigned respectively to various packaging devices. The input/output device $IO_{nm}$ is assigned to a device for recording operation data. The input/output devices $IO_{IJ}$ connected to the slave stations $S_1, S_2, \ldots, S_i, \ldots, S_k, \ldots, S_n$ are allotted their own addresses $A_{IJ}$, respectively. Some input/output devices $IO_{IJ}$ are also allotted identical second addresses $B_1, B_2, B_3$.

FIG. 2 shows frames and frame structures for use in the signal transmission network shown in FIG. 1. Each frame is basically composed of an address information block, an address information error detecting block, an input/output information block, and an input/output information error checking block, arranged in the order named, as shown in FIG. 2 at (a). FIG. 2 also shows at (b) a frame structure which includes a synchronizing block added to the leading end of the frame shown in FIG. 2 at (a), and an additional block at the trailing end of the frame shown in FIG. 2 at (a). The synchronizing block is a block with a recorded code for synchronizing transmission and reception of the frame. The address information block, indicated by AD in FIG. 2 at (b), is a block with address information of one of the input/output devices $IO_{IJ}$ which is accessed, and also with control information for controlling the slave stations, e.g., information for identifying input and output operations. In FIG. 2 at (b), the control information is shown as being recorded following the address information. However, the address information may be recorded following the control information, with the hardware being arranged to process the information in that order. At any rate, either the address information or the control information may come first.

FIG. 3 shows a sequence of bits of control information by way of example. As shown in FIG. 3 at (a), the control information is composed of four bits W, R, DC1, DC2. As shown in FIG. 3 at (b), the two bits W, R are used as an identifier to determine whether the frame is a frame for a non-operation, which does not effect normal input and output operations (as described later on, this frame can be used to collect special input information such as an emergency shutdown input signal), whether the frame is a frame for an output operation, and whether the frame is a frame for an input operation. As shown in FIG. 3 at (c), the other two bits DC1, DC2 are used as an identifier to determine whether the frame is a normal operative frame that effects a single complete input or output operation with a single frame, or a duplication-check frame that effects a single complete input or output operation with a set of two identical frames.

The address information error detecting block shown in FIG. 2 is a block with a recorded code for finding a change or modification of the address information and the control information contained in the address information block, which may have been modified or rewritten by noise or the like during transmission of the frame.

FIGS. 4A and 4B show examples of the manner in which the first code is generated.

It is assumed that the address information block AD (see FIG. 2) is composed of 32 bits $d_1 \sim d_{32}$, as shown in FIG. 4A. These bits are divided into eight groups $d_1 \sim d_4, d_5 \sim d_8, \ldots, d_{29} \sim d_{32}$, each containing four bits, and the following logic operations are effected on the bits in these groups to determine even parity $C_1, C_2, \ldots, C_8$:

$$C_1 = d_1 \oplus d_2 \oplus d_3 \oplus d_4$$

$$C_2 = d_5 \oplus d_6 \oplus d_7 \oplus d_8$$

$$\ldots\ldots\ldots\ldots$$

$$C_8 = d_{29} \oplus d_{30} \oplus d_{31} \oplus d_{32}$$

where ⊕ indicates an exclusive-ORing operation. The even parity $C_1, C_2, \ldots, C_8$ or odd parity $\overline{C}_1, \overline{C}_2, \ldots, \overline{C}_8$ which is the inversion in polarity of the even parity can be used as the first code.

Alternatively, as shown in FIG. 4B, the first code may be generated using a check sum. More specifically, the 32 bits $d_1 \sim d_{32}$ of the address information block AD are divided into four groups $d_1 \sim d_8$, $d_9 \sim d_{16}$, $d_{17} \sim d_{24}$, $d_{25} \sim d_{32}$, each containing eight bits, and the groups are regarded as numerical values $D_1, D_2, D_3, D_4$ each represented by eight bits. These numerical values are added to find an arithmetic sum:

$$C = D_1 + D_2 + D_3 + D_4$$

(any carry is ignored), and the arithmetic sum C (of eight bits) is used as the first code. The process of generating the first code is not limited to the above two processes shown in FIGS. 4A and 4B, but the first code may be generated using a CRC (Cyclic Redundancy Check) code or the like.

The input/output information block ID shown in FIG. 2 is a block containing output information to be written in an input/output device having the address recorded in the address information block AD, or input information read from an input/output device having that address.

The input/output information error detecting block CD shown in FIG. 2 is a block containing a second code for finding a change or modification of the signal recorded in the input/output information block, which may be caused due to noise or the like during the transmission of the frame. The second code is generated in the same manner as the first code. However, the first and second codes may not necessarily be generated by the same process and may not necessarily be of the same polarity.

The additional block OD is provided if it is necessary to supplement, or add additional information to, the information recorded in any of the above blocks. The additional block OD may not necessarily be at the trailing end of the frame, but may be in any of various positions such as between the address information error detecting block CA and the input/output information block ID. A plurality of additional blocks may be simply employed as they are or may be positioned so as to divide the address information and the input/output information. For example, to supplement a check sum employed in the address information error detecting code, the bits of the address information may be divided into groups each composed of eight bits, even parity for each of the groups may be employed as an additional block, and one bit of the additional block may be added immediately after the final bit of each group of the address information. In any case, the additional block has no important bearing on the present invention, and will not be described in detail below.

FIG. 2 shows at (c) a number of successive frames each having the structure shown in FIG. 2 at (b). The frames include a frame for an input operation, a frame for an output operation, and a frame for a non-operation, which are mixed together. In this embodiment, these frames are successively transmitted from the master station M.

FIG. 5 shows another sequence of frames.

While each frame as a synchronizing block in FIG. 2, the synchronizing block may not necessarily be provided in each frame. As shown in FIG. 5, a synchronizing block may be taken out of each frame and established as a synchronizing frame, and the other portion of the frame than the synchronizing frame may be established as a normal frame. One synchronizing frame may be transmitted each time 100 of such normal frames are transmitted. Since many frames are transmitted without gaps or interruptions, they can sufficiently be synchronized simply by inserting synchronizing frames from time to time. Various methods are known for synchronizing frames. See, for example, *Digital Communication Primer*, supervised by Shoichi Noguchi and published by Ohmsha. As the synchronizing block is of a general nature, it will not be described in detail below.

Figure 6:
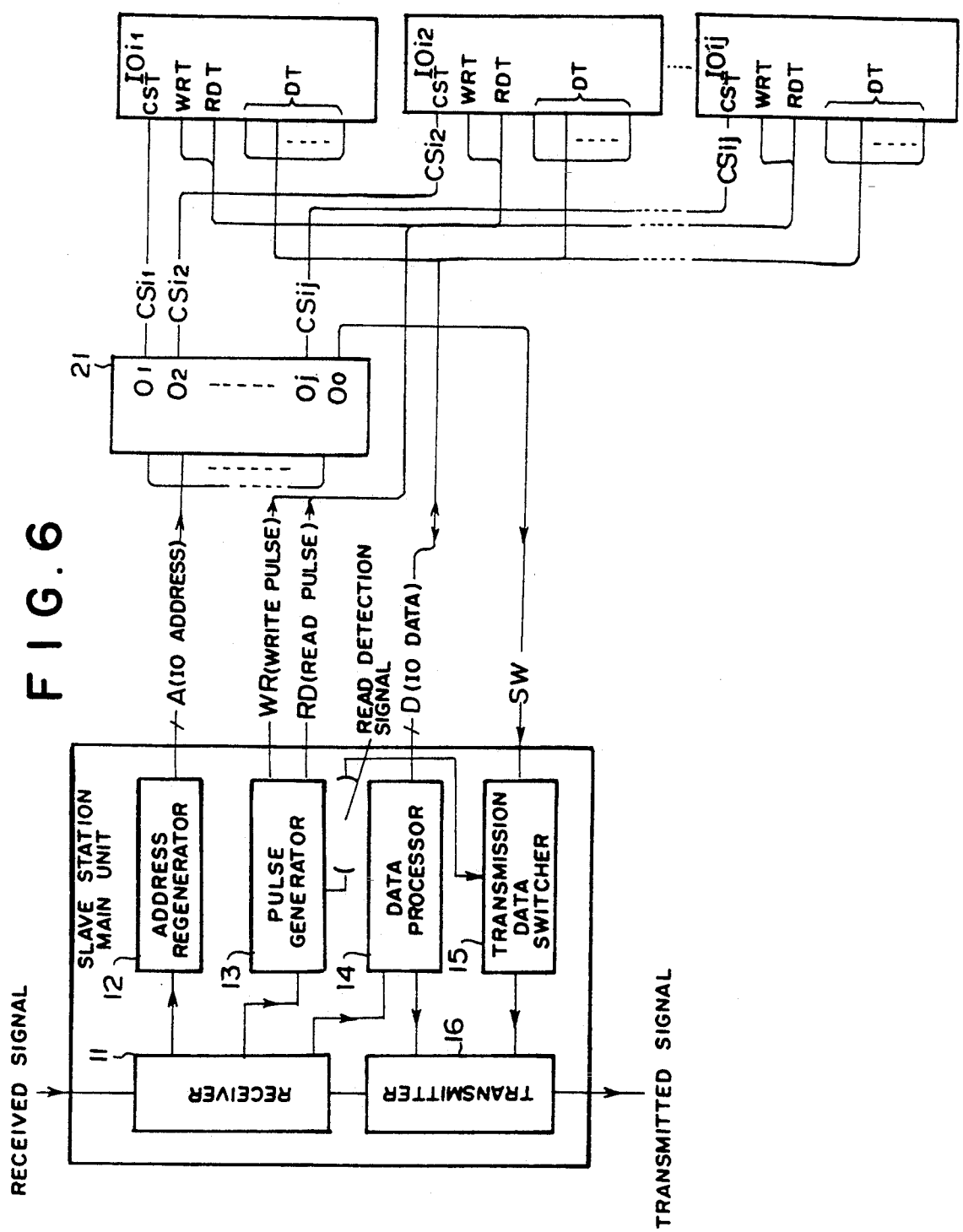
FIG. 6 is a block diagram of a hardware arrangement of a slave station.

FIG. 6 shows in block form a detailed hardware arrangement of the slave station $S_i$ which is illustrated here as representative of all the slave stations.

The slave station Si comprises a slave station main unit which is a piece of hardware that is identical and common among all the slave stations, and an address decoder which is different from slave station to slave station as to the internal logic structure and the number of output signals. An access detector is provided in the address decoder, and has an output terminal $O_o$.

For the sake of brevity, all input/output devices connected to the slave station $S_i$ are of the same type, and each have three access terminals, i.e., an input terminal CST for receiving a chip select signal, an input terminal WRT for receiving a write pulse, and an input terminal RDT for receiving a read pulse, and a plurality of data terminals DT.

All signals that are applied to the input terminals CST, WRT, RDT are positive logic signals which access the input/output devices when they are of "H" level.

When both input signals applied to the input terminals CST, WRT are of "H" level, the input/output devices $S_{i1} \sim S_{ij}$ receive output information D from the slave station main unit through the data terminals DT. When both input signals applied to the input terminals CST, RDT are of "H" level, the input/output devices $S_{i1} \sim S_{ij}$ transmit input information read therein to the slave station main unit through the data terminals D. Otherwise, the input/output devices are not accessed.

General input/output devices may include a dedicated output device with no input terminal RDT, a dedicated input device with no input terminal WRT, an input/output device with no input terminal CST, an input/output device, such as a RAM, with an input terminal of address A in addition to the input terminals CST, WRT, RDT, and an input/output device with some or all of the input terminals WRT, CST, RDT being of the negative logic type. Any of these general input/output devices can be used in the present invention by modifying connections or adding certain logic gates to achieve the basic arrangement shown in FIG. 6.

A switch or an LED which would be unable to read and write data alone may be used as an input/output device in the present invention if combined with a D latch with an output gate, which has an input gate and a three-state control input terminal. Most of general-purpose input/output devices combined with various dedicated ICs, e.g., a CRT display whose video input terminal is connected to a video processor, any of various magnetic recording devices connected to a dedicated control IC, and a printer connected to a microcomputer by a handshaking IC, may also be employed in the present invention.

Figure 7:
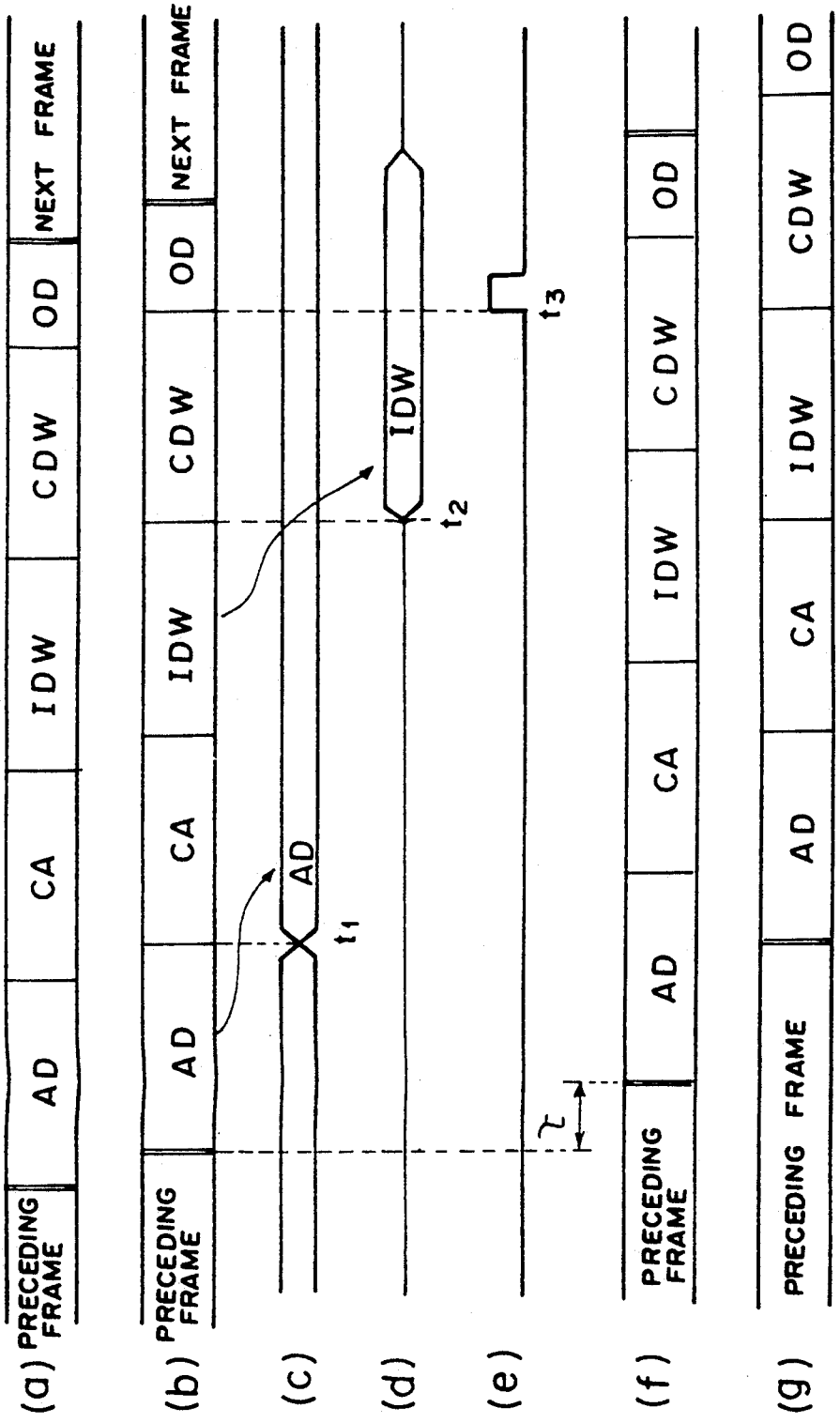
FIGS. 7 and 8 are timing charts of output and input operations of the slave station shown in FIG. 6.
Figure 8:
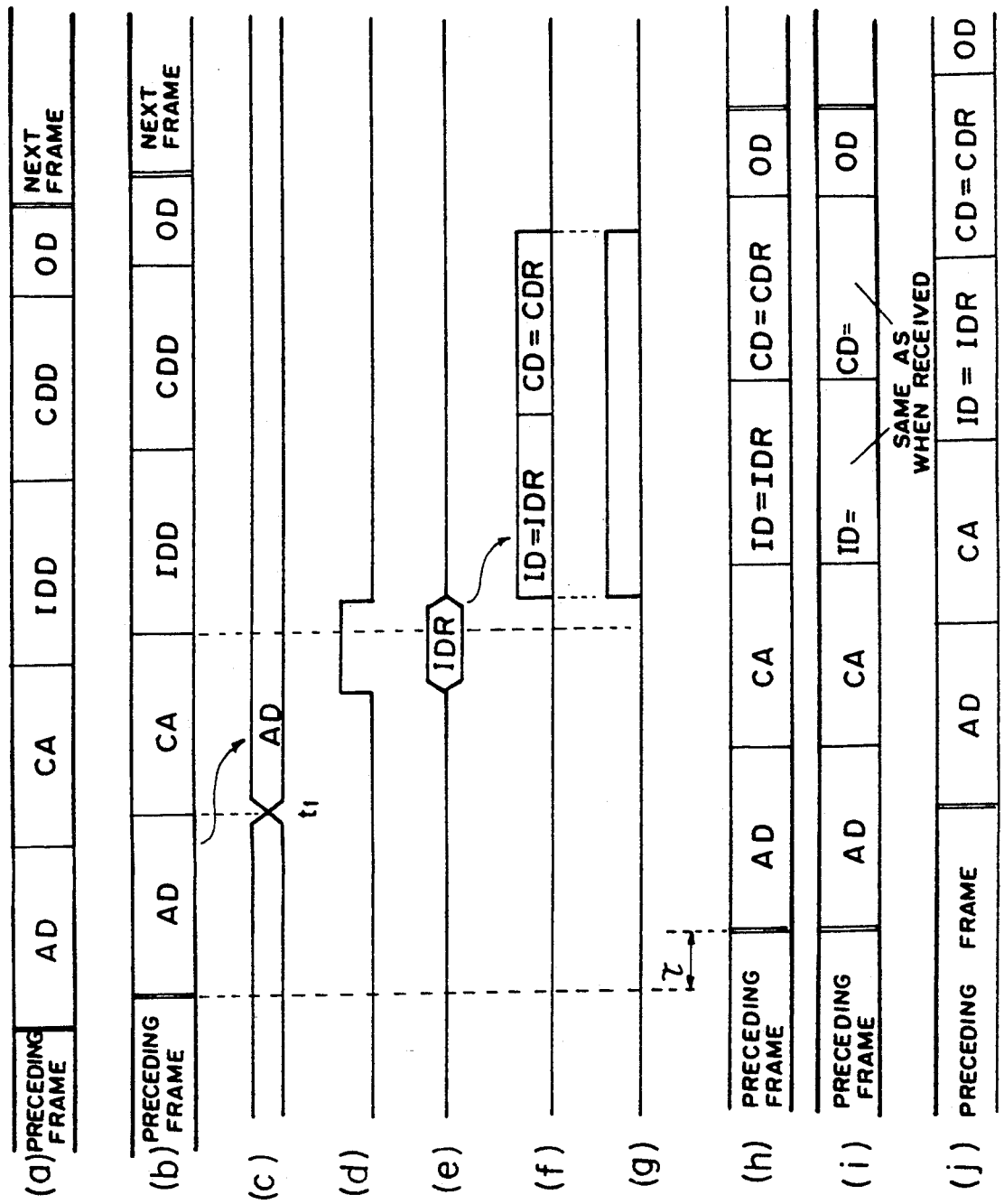

FIGS. 7 and 8 are timing charts of output and input operations of the slave station $S_i$ shown in FIG. 6.

First, the circuit arrangement shown in FIG. 6 will be described in detail below.

A frame having a structure shown in FIG. 7 at (a) is transmitted from the master station M shown in FIG. 1. After the frame has been transmitted through the intermediate slave stations $S_1, S_2, \ldots$, it is applied as a serial signal to a receiver 11 in the slave station $S_i$. The frame applied to the slave station Si is slightly delayed with respect to the original frame transmitted from the master station M due to a time lag caused by the passage through the intermediate slave stations $S_1, S_2, \ldots$, and a time lag caused by the circuit operation in the slave station $S_i$.

The address information contained in an address information block AD of the received frame is supplied through the receiver 11 to an address regenerator 12, and converted by the address regenerator 12 from a serial signal into a parallel signal, which is applied to an address decoder 21. The control information contained in the address information block AD is supplied through the receiver 11 to a pulse generator 13. In response to the supplied control information, the pulse generator 13 generates a write pulse WR and a read pulse RD. If the frame is a frame for an input operation, the pulse generator 13 supplies a transmission data switcher 15 with a read detection signal indicating that the frame is a frame for an input operation. The details of the transmission data switcher 15 will be described later on. The receiver 11 determines whether the information recorded in the frame has been modified or rewritten due to noise or the like, based on the information contained in an address information error detecting block CA and an input/output information error detecting block CDW of the received frame. The information indicative of the result of the check is also supplied to the pulse generator 13. In the event of an input operation, the input/output information may not be checked for validity, but only the information contained in the address information block CA is checked for validity according to this embodiment. If notified that the information recorded in the frame is wrong, the pulse generator 13 is controlled not to generate a write pulse WR even at a predetermined time in the event that the frame is a frame for an output operation, and not to transmit the read detection signal to the transmission data switcher 15 in the event that the received frame is a frame for an input operation.

If the received frame is a frame for an output operation, then the input/output information contained in an input/output information block IDW of the received frame is supplied through the receiver 11 to a data processor 14, from which the input/output information is transmitted to the input/output devices. If the received frame is a frame for an input operation, then input information (appearing at the data terminals DT) read from any one of the input/output devices is supplied to the data processor 14 at the time a read pulse is generated by the pulse generator 13. The input information supplied to the data processor 14 is converted thereby from a parallel signal into a serial signal at a suitable time.

The transmission data switcher 15 determines whether the information contained in the input/output information block IDW of the frame received by a transmitter 16 is to be replaced with the input information supplied to the data processor 14, based on a signal SW indicating that the frame supplied to the receiver 11 represents the address of any one of the input/output devices connected to the slave station $S_i$, and also based on a read detection signal indicating an input operation.

The address decoder 21 generates a signal of "H" level from any one of its output terminals $O_1, O_2, \ldots, O_j$ depending on an address (bit pattern) supplied from the address regenerator 12. If the address from the address regenerator 12 is not the same as any of the addresses of the input/output devices $IO_{i1}, IO_{i2}, \ldots, IO_{in}$ connected to the slave station $S_i$, then any signals from the output terminals $O_1, O_2, \ldots, O_j$ of the address decoder 21 remain to be of "L" level. The output terminals $O_1, O_2, \ldots, O_j$ are connected to the chip select terminals CST of the input/output terminals $IO_{i1}, IO_{i2}, \ldots, IO_{in}$.

The output terminal $O_o$ of the address decoder 21 is the output terminal of the access detector provided therein. The output terminal $O_o$ goes high in level when a terminal representing an output signal calculated by:

$$SW = CS_{i1} + CS_{i2} + \ldots + CS_{ij}$$

where + indicates an ORing operation, i.e., any one of the other output terminals $O_1, O_2, \ldots, O_j$, goes high in level. The output terminal $O_o$ goes low in level when all the output terminals $O_1, O_2, \ldots, O_j$ remain low in level. As described above, the signal SW is applied to the transmission data switcher 15.

Operation of the circuit arrangement shown in FIG. 6 to effect an output operation will be described below with reference to FIG. 7.

At a time $t_1$ when the final item of information contained in the address information block AD of the received frame is supplied, an address is regenerated and latched by the address regenerator 12, and parallel address information is supplied to the address decoder 21. If the address indicates either one of the input/output devices connected to the slave station Si, then either one of the output terminals $O_1, O_2, \ldots, O_j$ of the address decoder 21 goes high in level (see FIG. 7 at (c)). It is assumed here that the address of the input/output device $IO_{i1}$ connected to the slave station $S_i$ is selected. Therefore, the output terminal $O_1$ of the address decoder 21 goes high in level, and the chip select terminal CST of the input/output device $\overline{IO}_{i1}$ is enabled. Then, at a time $t_2$ when the final item of output information contained in the input/output information block IDW is supplied, this output information is latched, and thereafter outputted from the data processor 14. Thereafter, the contents of the address information error detecting block CA and the input/output information error detecting block CDW are checked, and at a time $T_3$ when all the contents recorded in the frame are confirmed as being correct, a write pulse WR is generated (see FIG. 7 at (e)). Since the chip select terminal CST of the input/output device $\overline{IO}_{i1}$ is enabled, the contents of information supplied to the data terminals DT is written into the input/output device $\overline{IO}_{i1}$ at the time $t_3$. The frame supplied to the slave station $S_i$ is delayed by a short time lag $\tau$ caused by the circuit operation in the slave station $S_i$, and then transmitted to the next slave station $S_{i+1}$. The signal which has successively passed through the slave stations $S_1, S_2, \ldots, S_n$ is finally returned to the master station M (see FIG. 7 at (g)). The master station M checks the returned signal to determine whether it is the same as the signal which the master station M has transmitted or has been modified or rewritten due to noise during the transmission.

The input/output devices $IO_{ij}$ shown in FIG. 1 are allotted their own addresses. In addition, the input/output devices $IO_{11}$, $IO_{21}$, ..., $IO_{n1}$ are allotted a common address $B_1$, the input/output devices $IO_{12}$, $IO_{i2}$ are allotted a common address $B_2$, and the the input/output devices $IO_{22}$, $IO_{k2}$ are allotted a common address $B_3$. If the address $B_1$ is designated by the address information, for example, all the input/output devices $IO_{11}$, $IO_{21}$, ..., $IO_{n1}$ are given identical output information at one time, so that a number of output signals can be applied at one time with one frame. For example, if the input/output devices $\overline{IO}_{11} \sim \overline{IO}_{n1}$ are display units of one type, then the same video data can be displayed on all the display units in one output operation.

An input operation of the circuit arrangement shown in FIG. 6 will now be described with reference to FIG. 8. As with the output operation, at a time $t_1$ when the final item of information contained in the address information block AD, the address information is supplied to the address decoder 21. If the address designates either one of the input/output devices connected to the slave station $S_i$, then either one of the output terminals $O_1$, $O_2$, ..., $O_j$ of the address decoder 21 goes high in level (see FIG. 8 at (c)). It is assumed here that the address of the input/output device $IO_{i2}$ connected to the slave station $S_i$ is designated. Subsequently, a read pulse RD is transmitted before the contents of the address information error detecting code CA is confirmed (FIG. 8 at (d)). This is because even if the input information from the input/output device $IO_{i2}$ is introduced into the slave station $S_i$, no problem arises unless that input information is transmitted to the next slave station. At the time when the read pulse RD is transmitted, input information IDR appearing at the data terminals DT of the input/output device $\overline{IO}_{i2}$ is supplied to the data processor 14 (FIG. 8 at (e)), and converted from a parallel signal into a serial signal (FIG. 8 at (f)). In the input operation, whether the information contained in the address information block AD is correct or not may be confirmed by checking the code contained in the address information error detecting block CA, as described above. If the contents of the address information error detecting block CA is found correct after being checked, then the transmission data switcher 15 transmits a switchover pulse (FIG. 8 at (g)) which instructs replacement of dummy information contained in the input/output information block ID with the input information supplied to the data processor 14. When the switchover pulse is transmitted, the dummy information contained in the input/output information block ID is replaced with the input information, and the input/output information error detecting block is rewritten into a code corresponding to the input information, while the frame is being transmitted to the next slave station $S_{i+1}$ (FIG. 8 at (h)). Therefore, the input operation can be completed with a short time lag $\tau$ which is the same as the time lag in the output operation. According to the present invention, the input operation can therefore be effected at the same speed as the output operation.

In the input operation, when the dummy information is replaced with the input information, the dummy information and the input information may possibly coincide with each other. In that case, it may not be possible to ascertain whether the dummy information has returned as it is to the master station because of some error, or the dummy information has returned to the master station after it was replaced with the input information properly. According to the present invention, when a frame is transmitted from the master station, an even parity code is recorded in the input/output information error detecting block, and when dummy information is rewritten into input information in a slave station $S_i$, an odd parity code is employed. By thus employing codes of different polarity which are generated by the same process, the master station can distinguish the dummy information and the input information from each other even if they coincide with each other.

FIG. 8 shows at (i) a frame whose address information does not designate the input/output devices connected to the slave station $S_i$ or in which an error is found in the error detecting block CA. The information contained in the input/output information block ID and the input/output information error detecting block CD is not rewritten in the slave station $S_i$, but is transmitted as it is to the next slave station $S_{i+1}$ with the same short time lag $\tau$ as the time lag that would occur if the information were rewritten in the slave station $S_i$ (see FIG. 8 at (i)). In this manner, unless the information is disturbed during the transmission, the frame whose contents is written in any one of the slave stations $S_1$, $S_2$, ..., $S_n$ returns to the master station M, and the master station M can recognize the information inputted from a certain input/output device by checking the contents of the frame.

In this embodiment, there is provided a frame for a non-operation in addition to the frame for an output operation and the frame for an input operation as described above. Each of the slave stations determines whether the received frame is a frame for a non-operation or not, based on the control information shown in FIG. 3. Since the control information may be rewritten due to noise or the like during the transmission, the method of generating a code contained in the address information error detecting block and/or the method of generating a code contained in the input/output information error detecting block is commonly used for all of the frame for an output operation, the frame for an input operation, and the frame for a non-operation, and only the code for the frame for a non-operation is reversed in polarity. In this manner, even if the control information of the frame for a non-operation is rewritten, the frame can be recognized as a frame for a non-operation, and an erroneous operation due to noise or the like can be prevented from taking place.

A frame for a non-operation is originally a frame for idling, and does not effect an output operation and an input operation. When a frame for a non-operation is received, if information indicative of whether an emergency stop button is depressed or not is contained in the frame for a non-operation, then the host computer is not required to read the information by way of an input operation at all times. The information may be converted into an interrupt signal that may be put to effective use, with the result that software designing efficiency can greatly be increased.

Figure 9:
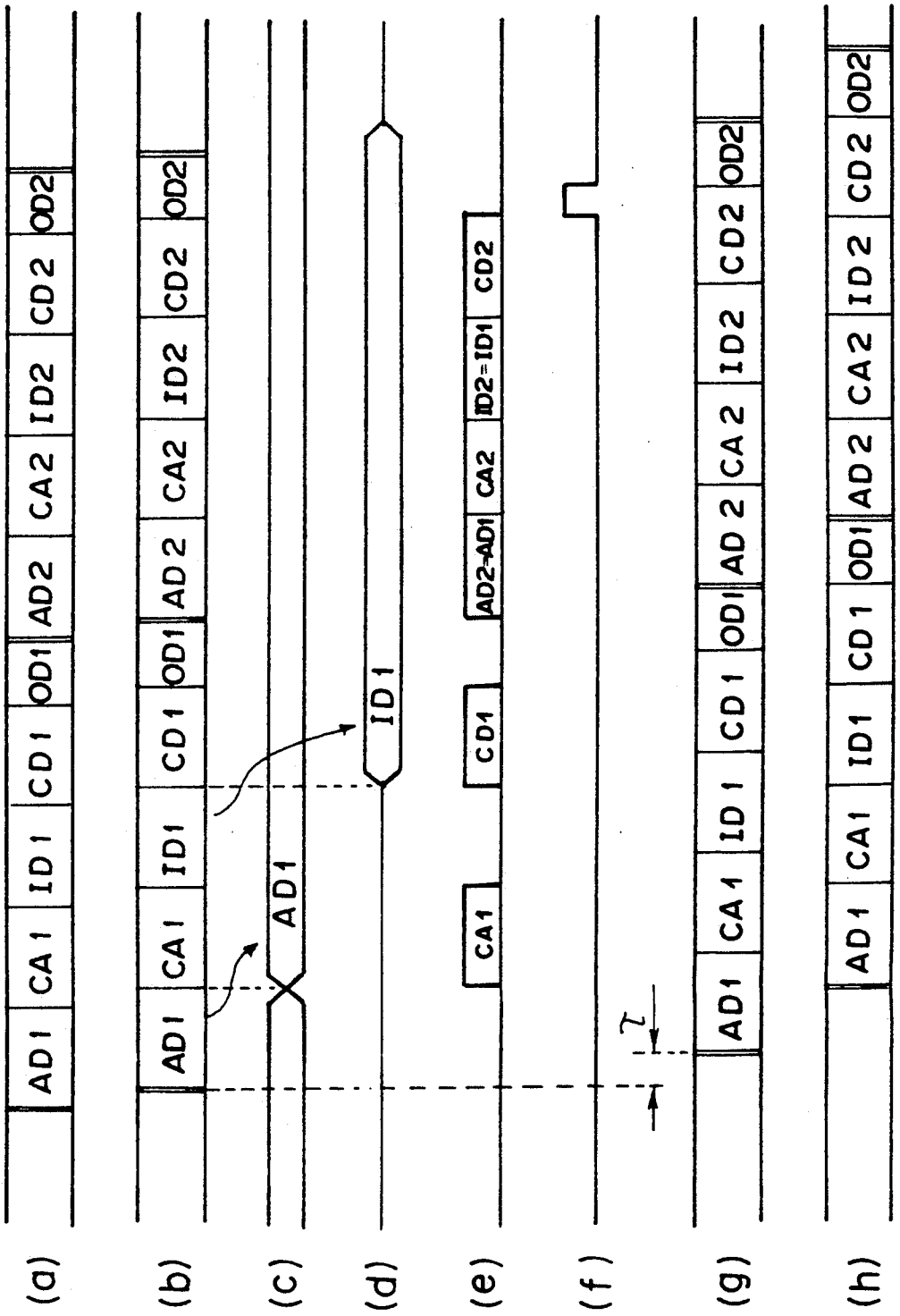
FIG. 9 is a timing chart of an output operation in a double check mode.

FIG. 9 is a timing chart of output operations in a duplication-check mode. Two frames of identical structure are successively transmitted from the master station M (see FIG. 9 at (a)), and reach the slave station $S_i$ with a predetermined time lag (see FIG. 9 at (b)). In the two frames, the control information designates a duplication-check mode as shown in FIG. 3 at (c). When a signal indicative of an address information block AD1 is supplied to the slave station $S_i$, an address signal is generated by the address generator 12, and either one of the output terminals $O_1$, $O_2$, ..., $O_j$ of the address decoder 21 goes high in level (FIG. 9 at (c)). When information contained in an input/output information block ID1 is supplied to the slave station $S_i$, the data processor 14 transmits output information to the data terminals DT of each of the input/output devices (FIG. 9 at (d)).

FIG. 9 shows at (e) times for checking the information in the slave station $S_i$. At the time a code contained in an address information error detecting block CA1 is supplied, the contents of the code is checked. At the time a code contained in an input/output information error detecting block CD1 is supplied, the contents of the code is checked. At the time information contained in an address information block AD2 is supplied, it is determined whether that information and information contained in an address information block AD1 are identical to each other. At the time a code contained in an address information error detecting block CA2 is supplied, the contents of the code is checked. At the time output information contained in an input/output information block ID2 is supplied, it is determined whether that information and the output information contained in the input/output information block ID1 are identical to each other. At the time a code contained in an input/output information error detecting block CD2 is supplied, the contents of the code is checked. If the successively supplied two frames are confirmed as being correct, a write pulse WR (see FIG. 9 at (f)) is generated, and the output information (see FIG. 9 at (d)) is written into a certain input/output device in timed relation to the write pulse WR. The frames (FIG. 9 at (g)) are transmitted to the next slave station $S_{i+1}$ with the same time lag $\tau$ as the time lag in the output and input operations described above with reference to FIGS. 7 and 8, and are finally received by the master station M (see FIG. 9 at (h)).

Figure 10:
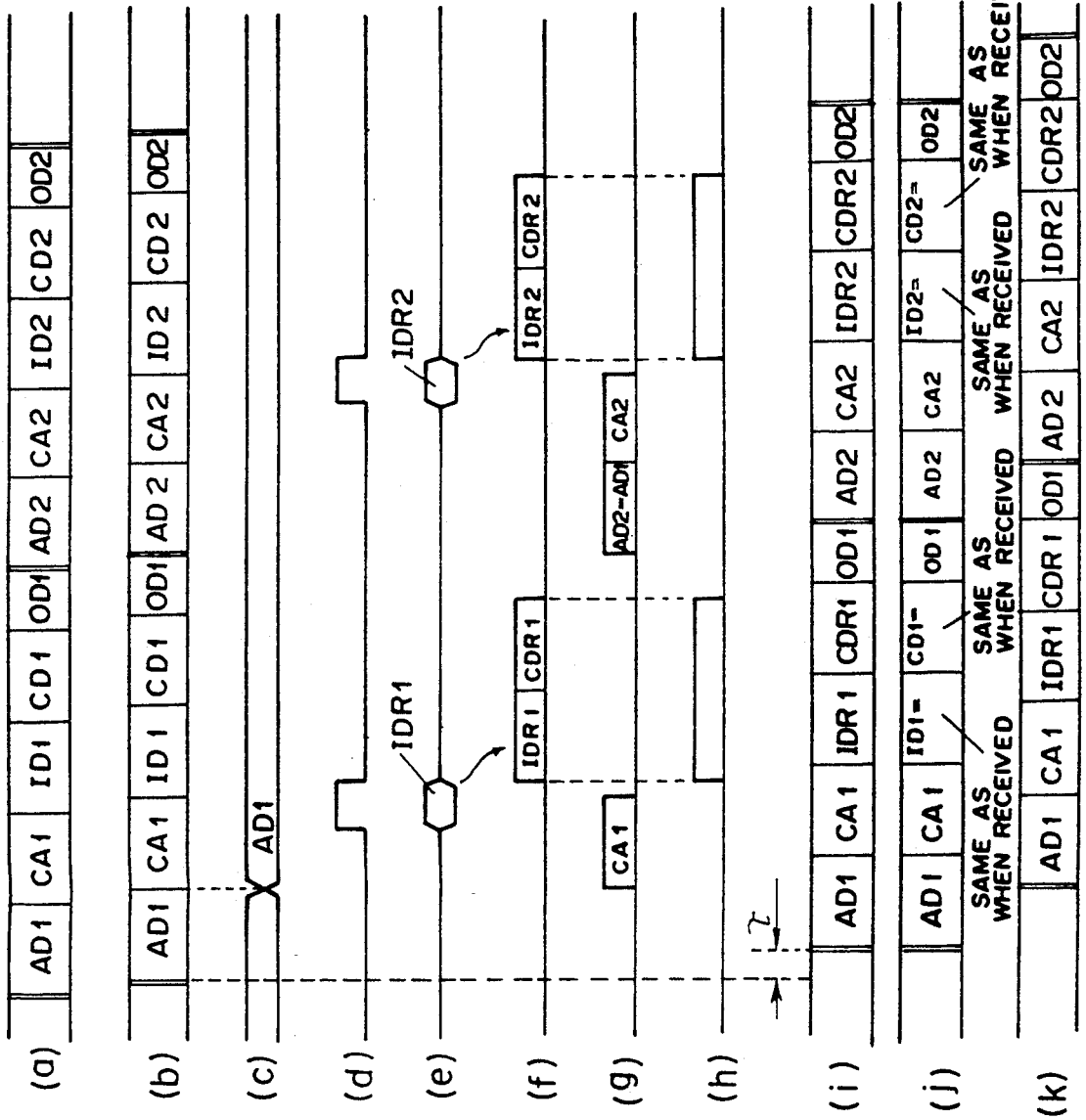
FIG. 10 is a timing chart of an input operation in the double check mode.
Figure 11:
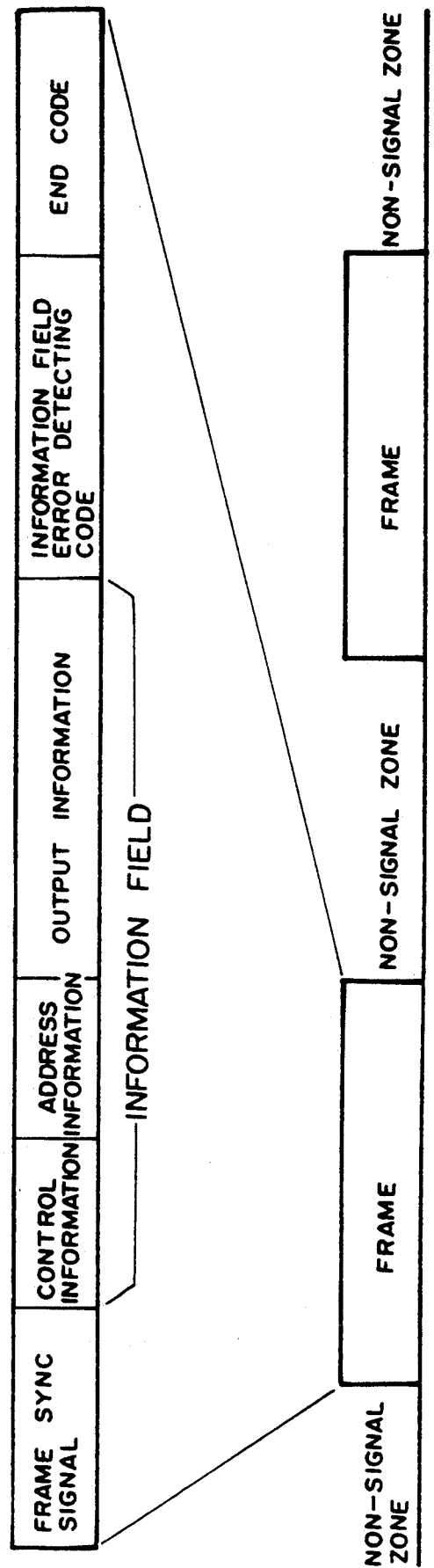
FIG. 11 is a diagram of frames of serial digital signals according to a LAN data format.
Figure 12:
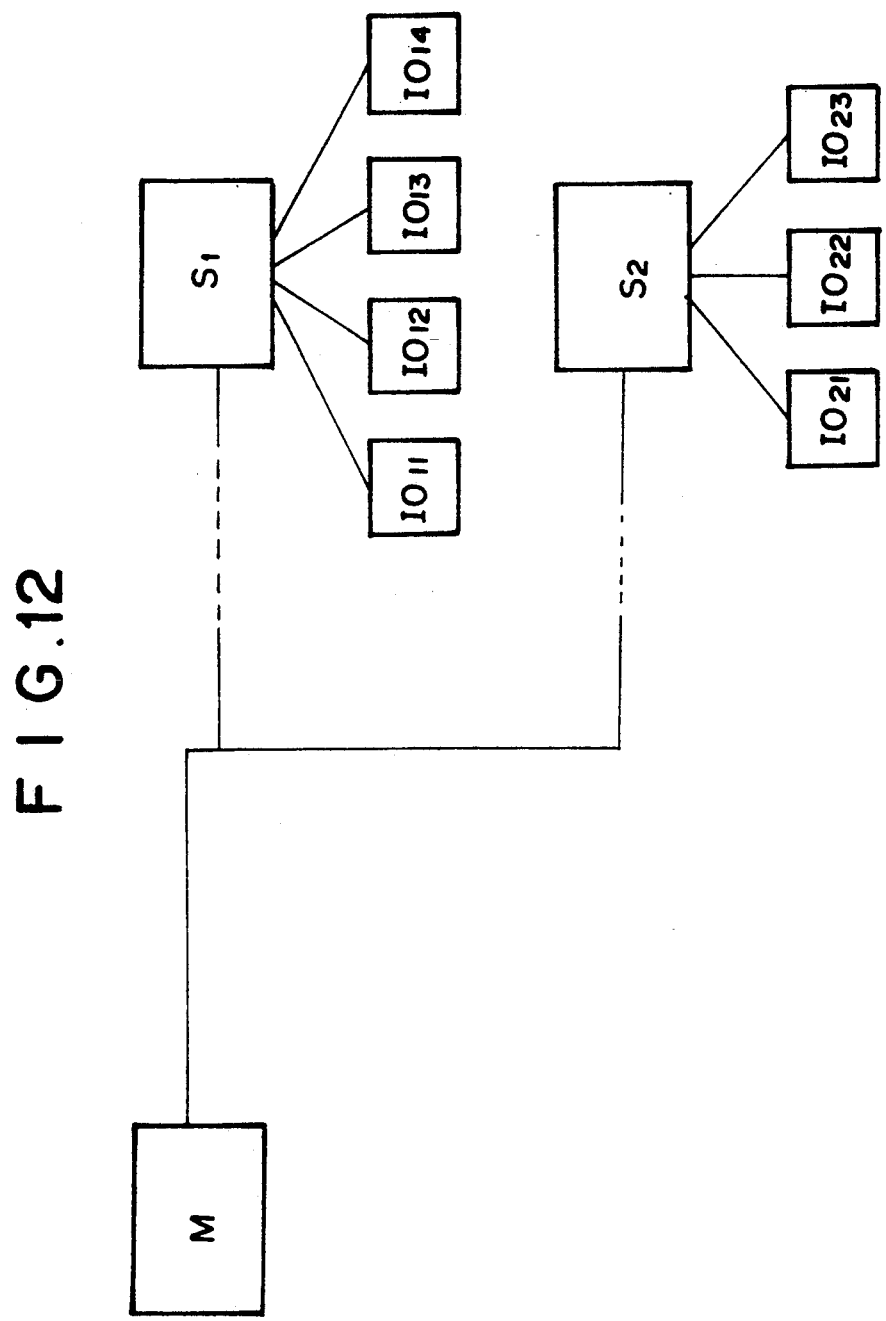
FIG. 12 is a block diagram of a master station and slave stations which communicate with each other according to a communication protocol for the LAN data format shown in FIG. 11.

FIG. 10 is a timing chart of input operations in the duplication-check mode.

As with the output operations in the duplication-check mode (FIG. 9), two frames of identical structure are successively transmitted from the master station M (see FIG. 10 at (a)), and reach the slave station $S_i$ with a predetermined time lag (see FIG. 10 at (b)). Two input operations are carried out in the same manner as described above with reference to FIG. 8 at (c) through (g). When the first input operation is effected, dummy information is replaced in input information if the contents of information stored in an address information block AD is correct as determined by checking a code contained in an address information error detecting block CA1. When the second input operation is effected, dummy information in the two frames is replaced with input information only if information contained in an address information block AD2 and information contained in an address information block AD1 coincide with each other, and if a code contained in an address information error detecting block CA2 is checked and found correct. The master station M which has received the two frames determines whether the contents of information contained in these two frames coincide with each other or not, thereby determining whether the input operations in the duplication-check mode are carried out properly or not. In the input operations in the duplication-check mode, the frames are transmitted to the next slave stations $S_{i+1}$ also with a time lag $\tau$ which is the same as the time lag described with reference to FIGS. 7 through 9.

With the above embodiment of the present invention, as described above, an input operation is completed only with a slight time lag as is the case with an output operation. Therefore, bidirectional communication is achieved at a much higher speed than bidirectional communication according to the conventional communication protocol. Each of the slave stations $S_1, S_2, \ldots, S_n$ may be equipped with a microcomputer, but may instead be constructed of a relatively simple piece of hardware without any microcomputer. Accordingly, the entire signal transmission system employing the method of bidirectional communication according to the present invention is inexpensive to construct.

In the bidirectional communication method according to the present invention, master and slave stations are interconnected in a loop, and frames which are identical in format for input and output operations are employed, each of the frames including an address information block, an address information error detecting block, and input/output information block and an input/output information error detecting block, which are arranged in the order named. In the input operation, dummy information in a received signal is replaced with input information in a slave station whose address corresponds to address information, and the input information is transmitted to a next slave station or the master station. Therefore, the input and output operations are carried out with substantially equal slight time lags. Especially in the input operation, much faster communications can be accomplished than communications according to the conventional communication protocol. The circuit arrangement of each slave station is simple, i.e., can be implemented by a simple piece of hardware, and does not require a microcomputer for control communication and software therefor. According to the conventional methods, each time the number of slave stations is increased, a microcomputer and software therefor have to be added, thereby increasing the time and expenses needed for designing the master and slave stations, and the complex communication protocol has prevented the control process from being carried out at high speed. According to the present invention, however, since no software is required in designing the master and slave stations, the time and expenses for designing the master and slave stations are greatly reduced, and the control process can be carried out at high speed. Each of the master and slave stations can easily be implemented by an LSI circuit. Consequently, the bidirectional communication method according to the present invention makes it possible to provide a remote control system which is inexpensive to construct, high in speed, small in size, and easy to handle.

Although a certain preferred embodiment has been shown and described, it should be understood that many changes and modifications may be made therein without departing from the scope of the appended claims.

I claim:

1. A method of bidirectional communication in a signal transmission network comprising one or more slave stations each connected to at least one input/output device for writing and/or reading digital information, said input/output device having at least one access terminal for access control, a master station for initially transmitting a serial digital signal containing output information to be written in said input/output device and for finally receiving a serial digital signal containing input information read from said input/output device, and a transmission route for transmitting said serial digital signals, said transmission route interconnecting said master and slave stations in a loop so that signals transmitted by said master station circulate successively through said slave stations and are received by said master station, the bidirectional communication including an output operation to write said output information transmitted by said master station into a desired one of said input/output devices in an output operation, and an input operation to transmit said input information read from a desired one of said input/output devices to said master station, said method comprising the steps of:

i) allotting each of said input/output devices its own address for selecting a device to be accessed in said output operation and/or said input operation;

ii) configuring a serial digital signal transmitted from said master station through said slave stations back to said master station, in a frame which is identical for said output operation and said input operation, said frame including an address information block containing address information indicative of the address allotted to said input/output device and control information for controlling said slave stations and said input/output device, an address information error detecting block containing a first code for detecting an error in a signal representing said address information block, an input/output information block containing said output information and/or input information, and an input/output information error detecting block containing a second code for detecting an error in a signal representing said input/output information block, with said address information block, said address information error detecting block, said input/output information block, and said input/output information error detecting block being arranged in the order named; and iii) transmitting, from said master station, said frame for said input operation with dummy information added to said input/output information block, and transmitting, from the slave station connected to said input/output device to which the address contained in said address information block in the transmitted frame is allotted, said input/output information block supplied to said slave station to a next slave station or said master station, while replacing said dummy information in said input/output information block with the input information read from the input/output device to which said address is allotted.

2. A method according to claim 1, wherein each of said slave stations comprises an address regenerator for regenerating said address information contained in the serial digital signal transmitted from said master station, through serial-to-parallel conversion, into a parallel output signal, and an address decoder for receiving a part or all of said parallel output signal from said address regenerator, and for generating a chip select signal as a parallel output signal for selectively accessing said input/output device through code conversion with logic gates.

3. A method according to claim 2, wherein each of said slave stations further includes an access detector having a logic arrangement for producing a predetermined logic output signal when at least one of the input/output devices is accessed.

4. A method according to claim 1, wherein said second code contained in at least a portion of said input/output information error detecting block of the frame for the input operation which is transmitted from said master station, is reversed in polarity in said slave station connected to said input/output device which has the address contained in said address information block of the frame for the input operation.

5. A method according to claim 1, wherein a plurality of the input/output devices have respective own addresses different from each other, and a common second address.

6. A method according to claim 1, wherein said address information block has an area for recording a duplication-check command code for effecting input and output operations with respect to a set of two identical frames which are successively transmitted from said master station.

7. A method according to claim 1, wherein said serial digital signal is available in a frame for the input operation, a frame for the output operation, and a frame for a non-operation, said frame for a non-operation being identical in format to the frames for input and output operations.

8. A method according to claim 7, wherein said first code and/or said second code contained in at least a portion of said address information error detecting block and/or said input/output information error detecting block of the frame transmitted from said master station is identical for said frame for the input operation, said frame for the output operation, and said frame for the non-operation, said first code and/or said second code being common in polarity for said frame for the input operation and said frame for the output operation, and being reversed in polarity for said frame for the non-operation.

9. A method according to claim 7, wherein when said frame for the non-operation is transmitted from said master station, the input information read from said input/output device is recorded in said frame for the non-operation.

* * * * *